United States Patent [19]

Callewaert

[11] Patent Number: 4,486,345
[45] Date of Patent: Dec. 4, 1984

[54] PROCESS FOR OBTAINING A GEL-FORMING PROTEIN PRODUCT

[75] Inventor: Danilo F. Callewaert, Ledegem, Belgium

[73] Assignee: N.V. Safinco, Izegem, Belgium

[21] Appl. No.: 440,195

[22] Filed: Nov. 5, 1982

Related U.S. Application Data

[63] Continuation of Ser. No. 99,153, Nov. 30, 1979, abandoned.

[30] Foreign Application Priority Data

Dec. 12, 1978 [GB] United Kingdom ............... 48116/78

[51] Int. Cl.³ ................................................. A23J 1/14
[52] U.S. Cl. .................................. 260/123.5; 426/573; 426/656; 426/431; 426/471; 426/472; 426/473; 426/495
[58] Field of Search ............... 426/573, 656, 456, 436, 426/489, 490, 461, 464, 465, 469, 471–473, 634, 431, 495; 260/123.5

[56] References Cited

U.S. PATENT DOCUMENTS

| | | |
|---|---|---|
| 2,495,706 | 1/1950 | DeVoss et al. ...................... 426/573 |
| 3,218,307 | 11/1965 | Eldridge et al. ................ 426/634 X |
| 3,261,822 | 7/1966 | Robbins . |
| 3,635,726 | 1/1972 | Sair . |
| 3,639,129 | 2/1972 | Mustakas . |
| 3,669,677 | 6/1972 | Sair . |
| 3,809,767 | 5/1974 | Sair . |
| 3,958,015 | 5/1976 | Gay ................................. 426/656 X |
| 3,965,086 | 6/1976 | Swain . |
| 3,971,856 | 7/1976 | Daftary . |
| 3,995,071 | 11/1976 | Goodnight, Jr. et al. ...... 426/656 X |
| 4,113,716 | 9/1978 | Gomi et al. . |
| 4,137,339 | 1/1979 | Kudo et al. ..................... 426/459 X |
| 4,219,470 | 8/1980 | Karnofsky ..................... 426/656 X |

FOREIGN PATENT DOCUMENTS 2032281 11/1970 France .
2390108 8/1978 France .

OTHER PUBLICATIONS

Journal of Food Science, vol. 38, pp. 1139–1144, (1973).

Primary Examiner—Robert Yoncoskie
Attorney, Agent, or Firm—Beveridge, DeGrandi & Kline

[57] ABSTRACT

A gel-forming protein product is prepared from a raw material of either defatted or non-defatted oil seeds or products derived therefrom, which contain proteins, carbohydrates and a polysaccharide fraction. The proteins are subjected to a thermal treatment in water. The thermal treatment comprises heating the proteins in one or more stages at a temperature above 50° C. The proteins need not be separated from other constituents of the raw materials but are separated from the polysaccharide fraction. The protein product can be formed into gels having desirable compressibility and elasticity characteristics. The gels are useful in foodstuffs.

13 Claims, No Drawings

PROCESS FOR OBTAINING A GEL-FORMING PROTEIN PRODUCT

This application is a continuation of application Ser. No. 099,153, filed Nov. 30, 1979, now abandoned.

BACKGROUND OF THE INVENTION

This invention relates to a method of obtaining a gel-forming protein product from oil seeds that may or may not be defatted.

Gel-forming products containing vegetable proteins are used in foodstuffs for human consumption, for example, in dietary and baby foods, in meat products, such as ham and chicken, and as a binding agent in meat emulsions.

It is known that oil seeds such as soy beans are used as raw materials for such products. Oil seeds, such as soy beans, ground nuts, sunflower seeds, rape seeds and the like, are made up of cells the walls of which can be described as the polysaccharide fraction. The cell content consists mainly of oil, protein and soluble sugars and minor constituents, such as minerals, lecithines, enzymes and many other substances, that together ensure that the seed can germinate and develop into a plant.

According to the known methods of obtaining a gel-forming product from these raw materials, the proteins therein are separated from the oils, the polysaccharide fraction and the soluble sugars and are subsequently subjected to a heat treatment in aqueous solution whereby bonds are formed in the native proteins which lead to gel formation.

An example of a conventional process for obtaining the protein is taken from Belgian Pat. No. 707 302 (Fuji Oil).

The soy beans are flaked and then—possibly after having been defatted by extraction with organic solvents—the flakes extracted with water as a result of which the native proteins dissolve together with the other water soluble constituents. The aqueous extract is separated from the insolubles. Subsequently, the solution is acidified to the isoelectric point as a result of which the proteins precipitate and can be separated from the constituents remaining in solution. The proteins are then redissolved by neutralization in aqueous medium. By heating the aqueous solution, for example to 100° C., the native protein is converted into a gel-forming product. The so-called soy isolate thus obtained has good water absorption, emulsifying and gel-forming properties. A disadvantage of this method, however, is that the method is cumbersome and expensive. Large facilities for the neutralisation and treatment of effluent are required and, besides, the yield is poor. Less than two-third of the protein present in the raw material is obtained as gel-forming protein.

Surprisingly I have now found that it is possible to obtain a product that forms a good gel by means of a heat treatment whereby it is not essential to separate the proteins from the other constituents beforehand. I have found that the polysaccharide fraction impedes the conversion of native protein to gel-forming protein, if this fraction is intimately mixed with the proteins as occurs on heating the material obtained by converting oil seeds into meal or flour.

According to the present invention I provide a method for obtaining a gel-forming protein product from either defatted or non-defatted oil seeds or products derived therefrom which contain protein, carbohydrates and oils whereby the proteins are subjected to one or more thermal treatments above 50° C. in water while maintained in a state of separation from the polysaccharide fraction, the duration of the thermal treatment being sufficient to convert proteins present into their gel-forming state.

By the use of this method the precipitation of the proteins by acidification and the subsequent neutralization of the precipitated proteins are no longer required.

DETAILED DESCRIPTION

According to the method of the present invention, it is not necessary to completely remove the polysaccharide fraction from the raw material prior to the thermal treatment from which the gel-forming product results. It is sufficient that this fraction is not intimately mixed with the proteins during the thermal treatment. Consequently, intact or broken seeds whose cell walls constitute the polysaccharide fraction can be subjected to the heat treatment as such, and a gel-forming product can thereby be obtained. The cell walls are then sufficiently separated from the protein fraction during the heat treatment.

If, on the other hand, defatted meal or white flakes are used as raw materials, the polysaccharide fraction is in closer contact with the proteins and must therefore be removed in one of several possible ways prior to the thermal treatment. The polysaccharide fraction can be inactivated by means of enzymes. Similarly, the fraction can be removed from a dispersion of the raw material by means of a centrifuge or sieve, because the particles of the polysaccharide fraction are heavier and larger than those of the other constituents. It is also possible to spray dry the dispersion and remove the polysaccharide fraction from the dry powder by sieving.

The polysaccharide fraction having thus been removed, a thermal treatment in water above 50° C. converts the proteins into a gel-forming product. Heating to a higher temperature will accelerate the conversion. The required duration of the thermal treatment does not only depend upon the temperature, but also upon the concentration of the proteins, at least if the raw material has been dispersed. If the seeds as such are subjected to the heat treatment, the proteins in the protein bodies are so concentrated and immobile that a longer heat treatment is required than for a 10–20% protein solution. Preferably, the thermal treatment is carried out between 50° and 150° C. The treatment can be given in one or more stages whereby one such stage may be a treatment at elevated temperature, which is desirable for other reasons, e.g., concentration by evaporation, sterilization by means of short heating at high temperature or spray drying.

If whole or broken seeds are used as raw material, the enzymes present in the seeds, which are undesirable from a nutritional point of view, can be inactivated by heating. This heat treatment can be a stage in the conversion of proteins to a gel-forming product, since polysaccharides in the cell walls are separate from protein bodies in the cell content. In the case of soy beans, these enzymes can be inactivated during the extraction of the beans with warm or boiling water in order to remove soluble sugars. Although these sugars do not impede the conversion to gel-forming proteins, it is nevertheless desirable to extract these sugars in case the gel-forming proteins are destined for human consumption. An extraction temperature should be chosen whereby the proteins are denatured and not extracted together with the sugars.

As mentioned above, meal and expellers can also be used as a raw material when using the method of the invention. These are co-products of the oil extraction from oil seeds and customarily used in cattle feed. In the case of soy beans, the meal is obtained by flaking beans that may be dehulled or not and by extracting the oil from the flakes with hexane. After hexane has been removed from the defatted flakes, the resulting white flakes are toasted whereby the enzymes antitrypsine and urease are destroyed.

The meal thus obtained is ground to a flour, which is then dispersed in water and homogenized under pressure. The homogenization can be preceded by wet milling in case the flakes are dispersed in the water. In this way, a suspension is obtained whereby most of the proteins, the oligosaccharides and some of the minerals are dissolved, and whereby the polysaccharides are in suspension. This suspension is unstable because the suspended particles settle in the course of time. If this suspension is subjected to a thermal treatment, no gel-forming product is formed, not even if the protein concentration is raised by partial evaporation.

The polysaccharide fraction is removed from this suspension. This can be done by means of a centrifuge or vibrating screen whereby the polysaccharide fraction is separated as a sludge or by spray drying the dispersion and subsequent removal of the polysaccharide fraction by sieving. The polysaccharide fraction can also be inactivated or broken down by using enzymes, for instance, cellulase.

The product is now free from the undesirable polysaccharide fraction and can be subjected to the thermal treatment in water that is essential for obtaining a gel-forming product. This thermal treatment can be carried out on the dispersion as such, but preferably after the dispersion has been concentrated by evaporation whereby this evaporation can be regarded as one of the stages of the heat treatment. It can also be carried out on a reconstituted solution made from a dehydrated dispersion. This dehydration can be achieved with known techniques, such as spray drying, freeze drying possibly preceded by concentration by evaporation, provided care is taken that the proteins are not denatured too much by dehydration.

It is possible to add the polysaccharide fraction again to the final product after this has undergone the thermal treatment.

White flakes can also be used as a raw material in the method just described. Since the protein in white flakes has not been denatured, the flakes are to be directly dispersed in water without prior inactivation of the enzymes. Otherwise the method is the same.

If the thermal treatment whereby a gel-forming product is formed is carried out on a protein with a relatively high isoelectric point, it is desirable to maintain the pH of the dispersion at at least 1, preferably 1.5, units above the highest isoelectric point of the protein. In the case of some raw materials, for example, rape seed, this implies the addition of a base.

It should be noted that it is not clear whether a polysaccharide or an unknown compound present in the polysaccharide fraction inhibits the conversion into a gel-forming product.

The following examples further define, describe and compare methods for obtaining a gel-forming product. A panimeter has been used to measure and assess gels. Such instruments are used frequently in the bakery sector to determine the compressibility and the elasticity of bread crumb. Such an instrument has been described on pages 106 and 107 of "Bakkerijtheorie-Deel I—Van graan tot meel" edited by T. N. O., Wageningen The Netherlands. This instrument gives two readings: compressibility S of a gel at a certain compression load expressed in scale units, and elasticity E, which indicates to what extent the gel recovers its original shape. Compressibility is measured at at least two loads, for example 500 and 900 g. A low value of S indicates a firm gel, and thus a high value indicates a weak gel. An elasticity E equals zero stands for absence of elasticity, whereas a value for E of 100 corresponds to perfect elasticity. All parts, proportions and percentages are by weight unless otherwise indicated.

EXAMPLE 1

One part toasted soy meal is heated in five parts boiling water for 20 min. in order to extract soluble sugars from the meal. The extracted meal is filtered off and heated for another 10 min. with five parts boiling water. The meal is again filtered off (both filtrates being discarded) and suspended in ten parts of water. The suspension thus obtained is comminuted (Microcut Stephan type MCV 12 B) and homogenized twice (Laboratory Homogenizer Model 15 M 8 TA Sub Micron Dispenser as supplied by Gaulin Corp. Garden Street, Everette, Mass. 02149) using a homogenization pressure of 250 bar. The temperature of the dispersion is about 70° C. and the solids content 6–7 weight percent.

The milky liquid thus obtained is then sieved through a vibrating screen (Finex 22 as supplied by Russell Finex Ltd., Russel House, London WC 2 N6AE) using a mesh width of 40 microns to remove the polysaccharide fraction.

The filtrate is subsequently spray dried (Niro Atomizer Spray Drying Plant, Type Production Minor as supplied by A/S Niro Atomizer, Gladsaxevej 305 Sø-borg, Copenhagen) as a result of which a light yellow powder is obtained with a protein content of 68 weight percent.

The polysaccharide fraction that inhibits gel formation having been removed, the powder is now subjected to the thermal treatment according to the method of this invention. The powder is, therefore, dissolved in water to a solids content of 20 and 25 weight percent, and the solutions thus obtained are kept at 80° C. for 60 minutes. After cooling (90 minutes in refrigerator), the solutions thus treated have become gels with the following properties (panimeter values):

| Solids Content | Load 500 g | | Load 900 g | |
| --- | --- | --- | --- | --- |
| | S | E | S | E |
| 20% | 33.5 | 73.1 | 46.5 | 73.1 |
| 25% | 9.3 | 81.1 | 17.8 | 78.9 |

In order to demonstrate the essential nature of the separation of the polysaccharide fraction, the dispersion is also spray dried immediately after homogenization. The 20 and 25 weight percent solutions prepared from the spray dried product are given a thermal treatment of 60 minutes at 80° C. but after cooling a viscous mass results without any elasticity. Even if the strength of the solution is raised to the protein level of the solutions made according to the method of this invention, the viscous masses fail to show any elasticity or gelling.

EXAMPLE 2

In this Example, soy beans are used as raw material. One part of dehulled soy beans is heated for 20 minutes in five parts of boiling water as a result of which proteins are denatured, harmful enzymes are destroyed and a large proportion of soluble sugars is leached out of the beans.

The beans are then wet milled and homogenized in fresh water as described under Example 1. The polysaccharide fraction inhibiting gel formation is then separated by the use of a centrifuge (DuPont Instruments Sorvall Centrifuge Type RC-5) for a period of 3 minutes at 6500 rpm (corresponding to 4700 g). The supernatant is then spray dried resulting in a cream colored powder that contains 49 weight percent protein and 34 weight percent oil based upon dry matter.

Dissolving this powder and subjecting the solutions to a thermal treatment yields gels with the following panimeter values:

| Solids Content | Load 500 g | | Load 900 g | |
|---|---|---|---|---|
| | S | E | S | E |
| 25% | 47 | 59 | 66 | 67 |
| 30% | 28 | 79 | 38 | 79 |

If in this Example the centrifuge stage is omitted and the homogenized suspension is spray dried immediately, then dispersion of the resulting powder and its subjection to a thermal treatment yields a product that has no gel characteristics whatsoever.

EXAMPLE 3

In order to investigate the effect of the duration of thermal treatment, a number of 25 weight percent solutions are made of a spray dried product prepared according to Example 2. These solutions were kept at 80° C. for a period of 60, 120 and 330 minutes. After cooling, the following gel properties are observed:

| Time of Thermal Treatment | Load 500 g | | Load 900 g | |
|---|---|---|---|---|
| | S | E | S | E |
| 60 min. | 47 | 59 | 66 | 67 |
| 120 min. | 45 | 60 | 66 | 59 |
| 330 min. | 38 | 73 | 63 | 70 |

These experiments show that the duration of the thermal treatment is not very critical, and that a longer treatment leads to a somewhat firmer gel.

EXAMPLE 4

The product mentioned in the last paragraph of Example 2, which was obtained by spray drying a non-centrifuged, homogenized dispersion, contains a polysaccharide fraction. By sieving this powder through a 38 micron mesh sieve, a fine and a coarse fraction are obtained.

The fine fraction (protein content 48 weight percent) is dissolved in water (solids content 30%) and subjected to a thermal treatment. The resulting gel has the following panimeter values:

| Solids Content | Load 500 g | | Load 900 g | |
|---|---|---|---|---|
| | S | E | S | E |
| 30% | 29 | 59 | 53 | 63 |

These values demonstrate that the removal of the polysaccharide fraction has been effective in obtaining a gel-forming product.

EXAMPLE 5

Untreated intact or broken soy beans are extracted in boiling water as in Example 2 and are subsequently subjected to thermal treatment for 180 minutes at 80° C. Subsequently, the beans are wet milled and homogenized as in Example 1, and the resulting dispersion is spray dried. The resulting powder is dissolved in water to a solids content of 25 and 30%, and the solutions are cooled and tested for gel properties using a panimeter.

| Solids Content | Load 500 g | | Load 900 g | |
|---|---|---|---|---|
| | S | E | S | E |
| 25% | 39 | 56 | 59 | 50 |
| 30% | 18 | 69 | 34 | 72 |

The product thus obtained forms a proper gel as opposed to a product that has not undergone the thermal treatment.

EXAMPLE 6

The homogenized dispersion as obtained in Example 2 is separated into two fractions by centrifuge, whereupon the fractions are separately spray dried. The powder resulting from the supernatant fraction is dissolved in water and subjected to a thermal treatment whereupon the powder resulting from the sludge fraction, i.e., the polysaccharide fraction inhibiting gel formation, is added to the solution. When cooled, the resulting gel has the following panimeter values:

| Solids Content | Load 500 g | | Load 900 g | |
|---|---|---|---|---|
| | S | E | S | E |
| 25% | 33 | 79 | 50 | 78 |

Addition of the polysaccharide fraction after the heat treatment has apparently not affected the gel properties. If both powders are mixed and dissolved together, then a product results that has also some gel properties because the spray drying of the supernatant already constitutes a stage of the thermal treatment.

EXAMPLE 7

One part soy beans is heated for 30 minutes in ten parts of boiling demineralized water. The beans are then wet milled and homogenized (80° C., 250 bar) in the water used for heating, and the resulting dispersion is centrifuged for a period of 5 minutes at 4000 rpm. The supernatant is then spray dried, and the resulting powder is dissolved in water to a solids content of 30, 35 and 40%. The thermal treatment given by the spray drying process is then supplemented by keeping the solutions for 60 and 120 minutes at 80° C. After cooling the panimeter values are:

| Solids Content | Thermal Treatment | Load 500 g S | Load 500 g E | Load 900 g S | Load 900 g E |
| --- | --- | --- | --- | --- | --- |
| 30% | 60 min. | 64 | 48 | | |
| 30% | 120 min. | 48 | 66 | | |
| 35% | 0 min. | 68 | 41 | | |
| 35% | 60 min. | 31 | 81 | 54 | 77 |
| 35% | 120 min. | 30 | 80 | 46 | 78 |
| 40% | 0 min. | 41 | 56 | 65 | 60 |
| 40% | 60 min. | 23 | 83 | 33 | 82 |
| 40% | 120 min. | 18 | 75 | 25 | 84 |

These experiments again demonstrate that spray drying on its own already induces part of the desired gel formation, but that a supplementary stage in the thermal treatment improves compressibility and elasticity of the gels. The experiments also demonstrate that the presence of soluble sugars necessitates a somewhat longer thermal treatment, but that these soluble sugars, as opposed to the polysaccharide fraction, do not inhibit gel formation.

EXAMPLE 8

White soy bean flakes with a high protein dissolving index (PDI=70%) are heated at boiling point for 30 minutes in demineralized water in a ratio of 1 part flakes to 10 parts water. During this period, soluble sugars dissolve, and proteins are thermally denatured. Precipitated proteins are separated from the sugar solution by means of a vibrating screen and homogenized (70° C., 250 bar) with fresh water. The homogenized dispersion is then centrifuged, and the supernatant is spray dried. The resulting powder has a protein content of 68.75% of the dry matter.

This product is dissolved in water to give a solids content of 20, 25 and 30%, whereupon the solutions are given an additional thermal treatment of 60 minutes at 80° C. After cooling, the gels exhibit the following panimeter values:

| Solids Content | Load 500 g S | Load 500 g E | Load 900 g S | Load 900 g E |
| --- | --- | --- | --- | --- |
| 20% | 47 | 76 | | |
| 25% | 16 | 78 | 32 | 76 |
| 30% | 11 | 80 | 18 | 82 |

EXAMPLE 9

Because the protein yield in Example 8 was only 50% because of incomplete denaturation, the experiment of Example 8 was repeated using white flakes that had been previously heated in an autoclave at 110° C. for 10 minutes. This raised the protein yield to 61%. The gel properties also improved as illustrated by the panimeter values:

| Solids Content | Load 500 g S | Load 500 g E | Load 900 g S | Load 900 g E |
| --- | --- | --- | --- | --- |
| 20% | 32 | 78 | 76 | — |
| 22.5% | 21 | 79 | 39 | 81 |
| 25% | 14 | 79 | 26 | 79 |
| 27.5% | 10 | 79 | 18 | 72 |

In this Example, the polysaccharide fraction that inhibits gel formation was removed by means of a vibrating screen. The protein content of the spray dried powder was also 68% as in Example 8.

EXAMPLE 10

In this Example, rape seed meal with a protein content of 38% is used as raw material. One part meal is added to ten parts demineralized water and the pH of the suspension raised to 8.5 using 2N caustic soda because rape seed protein has a relatively high isoelectric point. The suspension is heated at boiling point for 60 minutes whereupon it is wet milled and homogenized as such. The resulting dispersion is centrifuged, and the supernatant (pH=8.1) is spray dried. The resulting powder is dissolved in water to a strength of 35, 40 and 45%, since the protein content of the powder at 32% is low because of the presence of all soluble sugars. After a thermal treatment, the following gel properties are observed:

| Solids Content | Load 500 g S | Load 500 g E | Load 900 g S | Load 900 g E |
| --- | --- | --- | --- | --- |
| 35% | 57 | | | |
| 40% | 27 | 70 | 79 | |
| 45% | 15 | 76 | 29 | 83 |

EXAMPLE 11

Hulled and skinned groundnuts are used as raw material in this Example. Because of the high oil content of these nuts, the final gel-forming product is rich in oil.

The nuts are heated for 10 minutes in ten parts of boiling water, whereupon they are strained from the mother liquor. Subsequently, the nuts are heated for 30 minutes in fresh boiling water and wet milled and homogenized in this second mother liquor. The polysaccharide fraction is removed by centrifuge (4700 g), and the liquid fraction is spray dried. The protein content of the resulting powder is only 31% as against an oil content of 50% of the dry matter.

The powder is dissolved in water to a solids content of 35, 40 and 45%, and the solutions are subjected to a thermal treatment at 80° C. for 60 minutes. After cooling, the following gel properties are observed:

| Solids Content | Load 500 g S | Load 500 g E | Load 900 g S | Load 900 g E |
| --- | --- | --- | --- | --- |
| 35% | 78 | | | |
| 40% | 25 | 67 | 89 | |
| 45% | 15 | 71 | 33 | 77 |

EXAMPLE 12

The spray dried liquid fraction in Example 2 is defatted by extraction with hexane in a Soxhlet apparatus. This extraction raised the protein content from 49% to 64% and left 17% oil on a dry matter basis.

Solutions at 25 and 30% solids content are made from the defatted powder and subjected to a thermal treatment at 80° C. for 60 minutes. After cooling the gels had the following properties:

| Solids Content | Load 500 g S | Load 500 g E | Load 900 g S | Load 900 g E |
| --- | --- | --- | --- | --- |
| 25% | 36 | 76 | 55 | 79 |

-continued

| Solids | Load 500 g | | Load 900 g | |
|---|---|---|---|---|
| Content | S | E | S | E |
| 30% | 16 | 76 | 30 | 85 |

This invention is in no way limited to the above illustrative Examples and many modifications may be introduced in the Examples described within the framework of this application.

What is claimed is:

1. A process for preparing a gel-forming protein product from a raw material of either defatted or non-defatted oil seeds or products derived therefrom, wherein said seeds and products derived therefrom are comprised of proteins and carbohydrates including sugars and a polysaccharide fraction, said process comprising:

comminuting and homogenizing the raw material in the presence of water;

separating a fraction consisting essentially of polysaccharide from a protein solution in the resulting homogenized aqueous suspension by centrifugal separation or sieving; and subjecting the resulting protein solution to one or more stages of a thermal treatment in water at a temperature above 50° C. for a time sufficient to convert the proteins into a gel-forming product, one of the said stages consisting of spray drying said protein solution, the pH of the water being maintained at at least 1 pH unit above the highest isoelectric point of the proteins.

2. A process as claimed in claim 1 in which the separated polysaccharide fraction is added to the gel-forming protein after its formation by thermal treatment.

3. A process as claimed in claim 1 in which the raw material prior to comminuting and homogenizing is contacted with water to remove soluble sugars.

4. A process according to claim 1 in which the concentration of raw materials and the conditions of processing are controlled to give a protein concentration of from 10–20% by weight.

5. A process as claimed in claim 1 in which the thermal treatment is carried out between 50° and 150° C.

6. A process as claimed in claim 5 in which the separated polysaccharide fraction is added to the gel-forming protein after its formation by thermal treatment.

7. A process as claimed in claim 1 wherein the resulting protein solution after the removal of the polysaccharide fraction is concentrated by evaporation and this concentration constitutes a stage of the thermal treatment.

8. A process for preparing a gel-forming protein product from a raw material of either defatted or non-defatted oil seeds or products derived therefrom, wherein said seeds and products derived therefrom are comprised of proteins and carbohydrates including sugars and a polysaccharide fraction, said process comprising:

comminuting and homogenizing the raw material in the presence of water;

separating a fraction consisting essentially of polysaccharide from a protein solution in the resulting homogenized aqueous suspension by centrifugal separation or sieving; and subjecting the resulting protein solution to one or more stages of a thermal treatment in water at a temperature above 50° C. for a time sufficient to convert the proteins into a gel-forming product, one of the said stages consisting of a concentration by evaporation of the protein solution, the pH of the water being maintained at at least 1 pH unit above the highest isoelectric point of the proteins.

9. A process as claimed in claim 8 in which the raw material prior to comminuting and homogenizing is contacted with water to remove soluble sugars.

10. A process as claimed in claim 8 in which the separated polysaccharide fraction is added to the gel-forming protein after its formation by thermal treatment.

11. A process according to claim 8 in which the concentration of the raw materials and the conditions of processing are controlled to give a protein concentration of from 10–20% by weight.

12. A process as claimed in claim 8 in which the thermal treatment is carried out between 50° and 150° C.

13. A process as claimed in claim 12 in which the separated polysaccharide fraction is added to the gel-forming protein after its formation by thermal treatment.

* * * * *